March 27, 1956  C. J. GRACE, JR  2,739,325
RAMP APPARATUS

Filed May 25, 1950  2 Sheets-Sheet 1

Inventor:
CHARLES J. GRACE, JR.
by Andros and Smith
His Attorneys

March 27, 1956     C. J. GRACE, JR     2,739,325
RAMP APPARATUS
Filed May 25, 1950     2 Sheets-Sheet 2
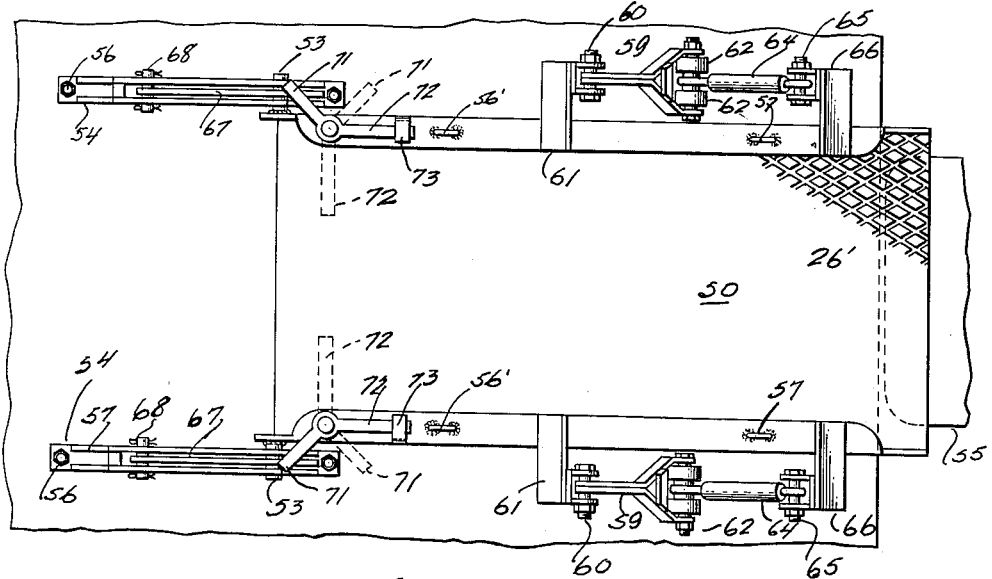
Fig. 7
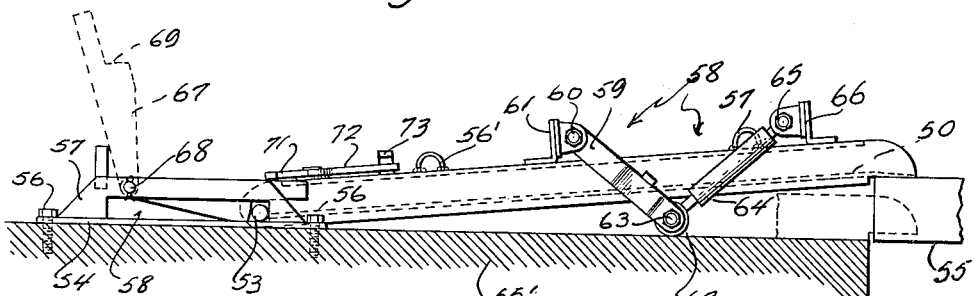
Fig. 8
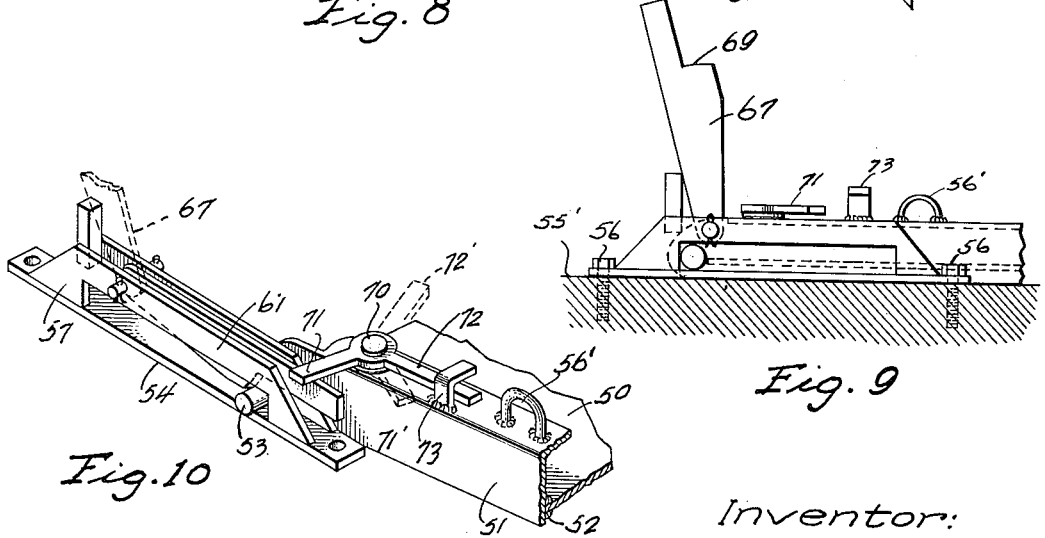
Fig. 9
Fig. 10
Inventor:
CHARLES J. GRACE, JR.
by Andros and Smith
His Attorneys.

United States Patent Office 2,739,325
Patented Mar. 27, 1956

2,739,325

RAMP APPARATUS

Charles J. Grace, Jr., Slingerlands, N. Y., assignor to Clausen Iron Co., Inc., Albany, N. Y., a corporation of New York Application May 25, 1950, Serial No. 164,261

3 Claims. (Cl. 14—72)

This invention has to do with improvements in ramp structures or apparatus. More particularly, it relates to ramp structures or apparatus adapted for use in loading and unloading vehicles disposed adjacent a dock, such as, for example, where it is necessary to bridge the gap between a motor truck and a loading dock, the floor height of which may not correspond exactly with the surface of the dock, in order to provide safe passage therebetween for industrial fork or other lift trucks, and the provision of such structures or apparatus is a principal object of the invention.

It is well known that few such loading docks are identical as to structural arrangement and nature of use. The height of a dock above a road or driveway generally depends upon the elevation of the building floor of the dock. The position and arrangement of the driveway depend in a large measure upon the level of the ground, surrounding buildings, etc. A variety of building materials are necessarily used in the construction of such docks, and the overhead conditions, or super-structures, will, of course, vary according to the building construction. At some docks the traffic is very heavy while at others a motor truck may be loaded or unloaded only occasionally during the day or night. At other docks, it is sometimes the custom to back the trailer in, unhook the tractor and leave it in position to be serviced as soon as possible. Aside from the structural strength necessary to support heavy industrial fork or other lift trucks, whether loaded or empty, provision must be made for absorbing impacts of considerable force which come from at least three sources, namely, when the industrial truck is run upon a ramp from the dock, when it leaves the motor truck, and when it stops suddenly upon the ramp structure.

Generally, therefore, it is another object of the invention to provide a ramp structure or apparatus that will overcome the foregoing difficulties and disadvantages, which is economic of manufacture, sturdy and durable of construction, and which will operate with efficiency and relative freedom from wear and tear, as well as other mechanical difficulties.

More specifically, it is an object of the invention to provide an apparatus which is adapted for use by trucks in loading and unloading vehicles disposed adjacent a dock, in which a ramp member is adapted to accommodate the passage of such trucks between the vehicles and the dock, with means so constructed and arranged at one end of the ramp member and cooperatively associated therewith that the same can be made to rotate with respect to the dock, and other means further so constructed and arranged, and cooperatively connected with a remaining portion of the ramp member, as to be adapted for use in causing rotation of the ramp member as desired.

Another object of the invention is to provide a type of ramp device which rests on the dock's surface, as well as a flush type of ramp device in which the ramp member is substantially level with the dock surface, whereby any stresses and strains imparted by the impacts of the truck on the ramp are absorbed by the dock itself by means of interlocking devices which lock the ramp structures in position at their inner ends.

Another object of the invention is the provision of such a device in which the ramp member readily can be moved horizontally so that it can be shifted in one direction to a position with its free end substantially flush with the edge of the dock, thus preventing bumping thereof by the next motor truck when placed adjacent thereto and also to permit the closing of overhead doors, and in an opposite direction with its free end extending a substantial distance beyond the edge of the dock for loading and unloading purposes.

Another object of the invention is the provision of such a structure or apparatus in which there is provided a locking device cooperatively associated with each of the bearings, and mountings, such as for example, trunnions, in the ramp structure to cause the ramp member to be held in its operative position.

A further object of the invention is to provide a plurality of means or mechanism for elevating the ramp structure in order that costs may be reduced and that individual requirements may be met economically, such as, for example, by the tilt mechanism of a fork truck, by an overhead hoist, by counterbalances, or by an hydraulic cylinder operated manually or by an electrical or mechanical pumping mechanism.

Another object of the invention is to provide such structures or apparatus as above described which will more closely fit the varying structural or physical conditions of present day docks and the volume of traffic passing thereover.

Other objects of the invention will in part be obvious and will in part appear hereinafter.

The invention accordingly comprises the features of construction, combination of elements and arrangement of parts which will be exemplified in the construction hereinafter set forth and the scope of the application will be indicated in the claims.

For a fuller understanding of the nature and objects of the invention reference should be had to the following detailed description taken in connection with the accompanying drawings in which:

Fig. 7 is a plan view of another embodiment of the invention illustrated in Figs. 1 through 3;

Fig. 8 is a side elevational view of the structure or apparatus depicted in Fig. 7;

Fig. 9 is an elevational view of a fragmentary portion of the inner end of a ramp structure with ramp mountings located in a bearing member; and Fig. 10 is a perspective view of Fig. 9.

It will be understood that while the invention disclosed herein is particularly adapted for use in connection with motor trucks, trailers, and the like, which are adapted to be moved alongside of docks of the character herein disclosed, that such vehicles will include barges, freight cars, flat cars, etc., which are moved into position along the side of such docks for loading and unloading purposes.

Referring now more particularly to the drawings and especially Figs. 1 through 6, there is disclosed one type of ramp structure or apparatus embodied by the invention as indicated generally at 25. This apparatus comprises a ramp member 26 which is of an area adapted to accommodate the passage of industrial fork or other lift trucks and preferably is constructed so as to provide a diamond or other tread-like configuration on its surface as indicated at 26', to provide traction for the wheels of the industrial truck.

The sides of the ramp member 26 may be provided with upstanding angular plates 27 to reinforce the same, as well as to mount other elements in connection therewith on each side thereof and preferably are welded thereto as indicated at 28.

Figure 4:
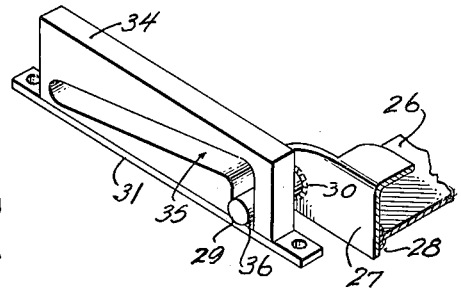
Fig. 4 is a perspective view of one form of a bearing and mounting for a ramp member, the latter being illustrated as a fragmentary portion thereof.
Figure 5:
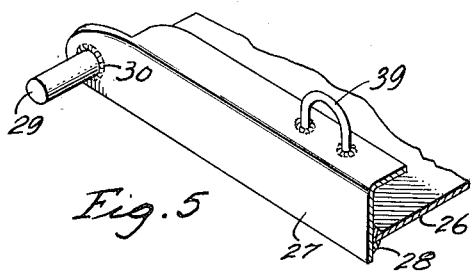
Fig. 5 is a perspective view of a fragmentary portion of the inner end of the ramp member and mounting for the bearing shown in Fig. 4.
Figure 6:
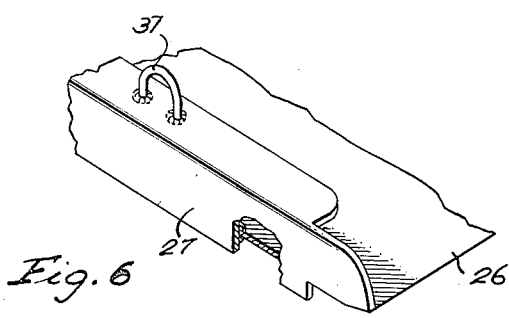
Fig. 6 is a perspective view of a fragmentary portion of the forward part of the ramp member, partly in section.

Adjacent each side of the ramp member 26 are trunnions or mountings 29 as they are preferably more broadly hereinafter referred to. These trunnions preferably are welded to the members 27 as indicated at 30 (Figs. 4 and 5). These mountings are adapted to fit in bearings 31 adapted to be secured to the surface of a dock 32 by means, for example, of expansion bolts 33. The bearings are disposed on opposite sides of the inner end of the ramp member and comprise upstanding structures 34 having elongated slotted openings 35 therein which function as tracks for the trunnions or mountings 29. In the illustration of the invention shown in Fig. 1 it will be seen that these elongated slots or tracks 35 preferably are inclined forwardly and terminate at their forward ends in a well 36 where the trunnions are rotatably mounted and firmly held in position, as will more fully be described in connection with the operation of this surface type of ramp apparatus. By surface ramp apparatus is meant such device that is intended to rest above or on the floor or surface of the dock, as distinguished from a flush type of ramp apparatus.

In advance of the trunnions 29 and bearings 31, on each side of the ramp member 26, and preferably on the angle plates 27 are ring elements 37 welded or otherwise suitably secured in position. Connected to these ring elements are links, preferably in the form of a chain 38, transversely extending across the ramp member 26.

Toward the forward end of the ramp structure 26, and on opposite sides of the angle plates 27, are similar rings 39 secured in position in any suitable manner also such as by welding or the like. These rings carry links 40, preferably also in the form of a chain, having hooks 41 at their free ends. These hooks are adapted to be attached to mast 42, through eyes 43 of an industrial fork or lift truck 44 indicated in dotted line position. The fork of such a truck is indicated in dotted lines at 45.

The embodiment of the invention just described is a preferred simplified surface type of construction, whereby such a ramp structure or apparatus readily may be shifted into and out of position. This type of surface apparatus is intended to remain disposed in position on the dock surface awaiting the arrival of industrial motor vehicles or trailers for the purpose of loading or unloading the same. When such a motor truck or trailer is backed up to the dock 32 it is entirely possible that the floor surface of a motor truck or trailer 47 may be in elevated position above the dock surface, rather than flush therewith.

Figure 1:
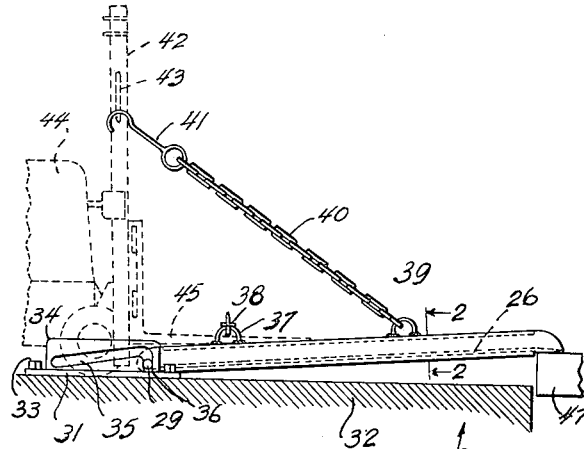
Fig. 1 is a side elevational view illustrating one embodiment of the invention, and depicting an industrial lift truck in dotted line position manipulating such a ramp structure or apparatus into operative position.
Figure 2:
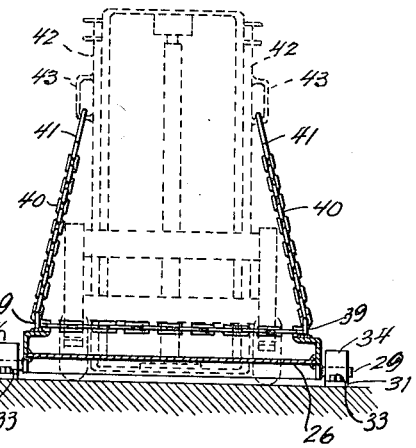
Fig. 2 is a front elevational view of Fig. 1, taken along the line 2—2 thereof, and looking in the direction of the arrows.
Figure 3:
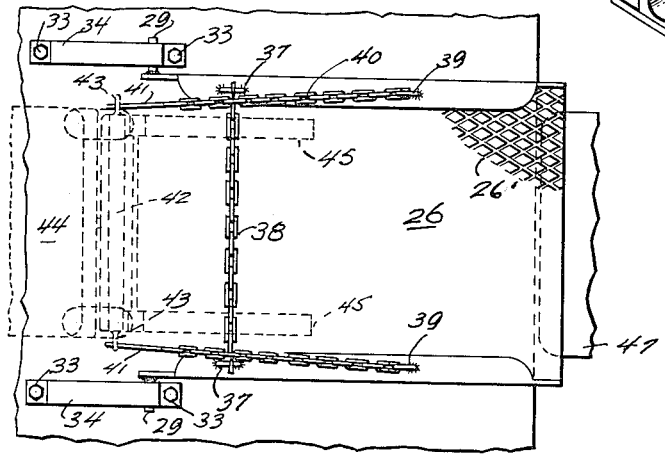
Fig. 3 is a plan view of Figs. 1 and 2.

In operation, when it is desired to load or unload such a motor truck or trailer, the industrial fork or lift truck is run into position adjacent the ramp apparatus 25 and normally the trunnions 29 will be rearwardly disposed in the elongated slots 35 so that the free end of the ramp structure is flush with the dock when the device is not in operation. This will prevent the truck floor or rear end of the trailer end 47 from bumping into the end of the ramp structure 26. It is therefore necessary to advance the ramp member 26 into operative position so as to bridge the gap between the truck floor 47 and the dock surface 32. The industrial fork or lift truck is then advanced to the inner end of the ramp structure 26 so that the fork 45 passes beneath the link or chain 38. Then the link 40 is connected by means of the hook 41 to the eyes 43 on the mast 42 of the industrial truck. The mast 42 is then brought to a lifting or tilting position in order to pick up or partially rotate the ramp member 26 around the trunnions 29 and the industrial truck advanced toward the trailer or motor truck body so that the trunnions 29 slidably are moved forwardly along the inclined elongated slots 35 until the trunnions drop into the well 36. In this position the ramp can be raised or lowered rotatably until it rests upon the end of the truck 47 as shown in Fig. 1. Because the mountings or trunnions 29 have dropped down into the well 36, they are firmly held in position.

The ramp member 26 now properly bridges the gap between the truck and the dock surface and the industrial lift or fork truck 44 has free access or passage from the dock to the motor truck or trailer for the purpose of loading or unloading the same. It will be observed that because of the interlocked position of the trunnions 29 in the bearings 31, the impacts of the truck passing over the ramp member 26 will cause the dock to absorb the resulting shocks which are of considerable force, without deflecting or throwing the ramp member 26 out of position.

It should be understood that while this form of the invention preferably is moved into position by a lift truck, it is also possible to engage the ring members 39 with an overhead chain-fall or block and tackle arrangement, whereby the same properly can be located.

In Figs. 7 through 10 there is illustrated a slightly different modification of the invention. In these views there is shown a similar type of ramp member 50 having upstanding side angle members 51 secured in position as by welding, as indicated at 52. At inner ends of the angles 51 on the ramp 50 are disposed, on opposite sides thereof, mountings or trunnions 53 which are adapted to be slidably and rotatably mounted in bearing members 54 also secured to the surface of a dock 55' by means of expansion or other suitable bolts 56. The bearings in this modification, however, are not provided with inclined slots but the upstanding bearing structures 57 have elongated slots 58, substantially horizontally disposed with respect to the dock surface to provide tracks or runways for the trunnions 53.

Such a ramp structure may similarly be advanced or retracted with respect to the edge of the dock, as described in connection with Figs. 1 through 6, so that when in an inoperative position the end of the ramp structure 50 will be flush therewith; and when in an operative position it will be advanced beyond the edge of the dock and rest upon a motor truck or trailer floor 55 as above described my means of a fork or lift truck. For this purpose there is also provided on the angle members 51, in advance of the trunnions 53, oppositely disposed and similarly secured ring members 56', so that a link or chain such as indicated at 38 can be used to span the distance therebetween. In advance of the ring members 56', toward the free end of the ramp member 50 and the angles 51 are a similar set of ring members 57, whereby the entire apparatus can be manipulated as above described by means of an industrial lift truck, or equivalent device, such as an overhead crane. However, another form of lifting arrangement is depicted in Figs. 7 and 8 in the form of an hydraulic lifting device indicated generally at 58. This constitutes oppositely disposed links 59 pivotally mounted at 60 on angle irons 61 suitably secured to the upper faces of the angle plates 51. At the opposite ends of the links 59 are rollers 62, pivotally secured to the links 59, as at 63, and these rollers engage the surface of the dock 55 connecting each of the links 59 at their lowermost points. That is, in alignment with the roller 62 is an hydraulic cylinder and piston 64 which in turn is pivotally mounted as at 65 on other angle irons 66 to the top plates of the angle members 51.

After this type of ramp is advanced into position so that the trunnions 53 will slide along the tracks provided by the elongated openings 58 in the bearings 57, it is desirable to lock the device in this forwardly located position. For this purpose there has been provided a locking bar or arm 67, pivotally mounted as at 68 at the rear end of the bearing member 54. As soon as the trunnions 53 have been advanced to their forward position, the locking bar 67 which has a shoulder 69 is pivotally dropped into position as indicated in the drawings so that the shoulder 69 comes into abutting relation with the trunnions 53.

Normally the weight of such a locking bar or arm will hold it into position to maintain the trunnions 53 in their forwardly located position and hold them against the impacts of industrial trucks passing to and fro over the ramp 50. However, in order to maintain the trunnions in absolutely locked position it is desirable to provide a locking device which will hold the arm 67 securely against the trunnions 53. Thus, there is mounted on top of the angle members 51, as at 70, a locking and truck stop member of substantially L-shaped configuration comprising two fingers 71 and 72 radially extending from the pivot point 70. After the locking arm bar 67 has been dropped into position as indicated, when the trunnions 53 have obtained their outermost position along the elongated slots or tracks in the bearing 54, the locking member is pivoted in order that the finger 71 overlies the top of the bar or arm 67 so that it cannot be jarred or jolted loose therefrom. In the meantime, the other finger 72 engages a hook 73 on the top of the plate 51 and preferably this hook is provided underneath with a flat spring (not shown in the drawings) to maintain the entire device in locked position. This locking device also performs another function, namely, when the ramp is not in this forwardly disposed operative position, the fingers 71 and 72 must, of course, be swung out of their locked position to assume a direction as indicated in dotted lines (Fig. 10) and thus this pivotally mounted locking member acts as a stop against the wheels of industrial fork or lift trucks attempting to cross the ramp member 50.

The ramp having been moved forwardly as above described, it is then necessary to raise the same above the surface of the dock surface 55' so that the ramp member can come to rest on the end of the motor truck or trailer floor surface 55. This is accomplished by means of the hydraulic lift mechanism indicated generally at 58 by actuating the same so that the ramp 50 is elevated and lowered into position until it engages the motor truck or trailer floor surface. Of course, the elevating and lowering of the ramp can take place before the ramp is moved into its forwardly extended position but that is a matter of choice.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a structure adapted to form a bridge between a warehouse dock and the floor of a vehicle adjacent said dock for the passage of trucks in loading and unloading said vehicle, the combination with a ramp comprising a platform of a length substantially greater than the space to be bridged and of a width adapted to pass said trucks; of trunnions laterally projecting from the opposite sides of said platform adjacent the inner end thereof; bearing members provided with means adapting them to be fixedly secured to said dock and relatively narrow elongated slots approximately the diameter of said trunnions in which said trunnions are rotatably and slidably received to move in directions longitudinally of said platform; a holding bar pivotally mounted on said bearing members adapted to hold said trunnions in position when said trunnions have been slid to the forward ends of said slots said holding bar locking said platform against longitudinal movement in either direction; and means disposed at each side of said platform adjacent the outer end thereof for raising and lowering said outer end by swinging said platform about the axis of said trunnions to an upwardly inclined operative position above said dock.

2. The structure set forth in claim 1 in which said means for raising and lowering the outer end of said platform is fluid actuated and includes a roller adapted to be supported and roll upon the surface of said dock as said platform is swung about the axis of said trunnions.

3. The structure set forth in claim 1 in which said means for raising and lowering the outer end of said platform comprises a toggle having a roller at the knee thereof adapted to be supported and roll surface of said dock, a first arm pivotally connected to said platform, and a second arm pivotally connected to said platform and comprising a cylinder and a piston thereon adapted to be actuated by fluid pressure in said cylinder to lengthen said arm.

References Cited in the file of this patent
UNITED STATES PATENTS

| Number | Name | Date |
|---|---|---|
| 479,533 | Schultz | July 26, 1892 |
| 502,568 | Kuckartz | Aug. 1, 1893 |
| 1,074,318 | Freas | Sept. 30, 1913 |
| 1,532,715 | Petrarca | Apr. 7, 1925 |
| 1,692,930 | Cummings | Nov. 27, 1928 |
| 1,870,719 | Fain | Aug. 9, 1932 |
| 1,905,947 | Morgan | Apr. 25, 1933 |
| 1,920,568 | Kling | Aug. 1, 1933 |
| 2,142,949 | Linker | Jan. 3, 1939 |
| 2,153,946 | Linstead | Apr. 11, 1939 |
| 2,449,829 | Agren | Sept. 21, 1948 |
| 2,452,289 | Bryson | Oct. 26, 1948 |
| 2,473,126 | Alexander | June 14, 1949 |
| 2,553,819 | Fox | May 22, 1951 |
| 2,599,808 | Bolick | June 10, 1952 |
| 2,626,411 | Palmer | Jan. 27, 1953 |